Patented June 12, 1945

2,378,152

UNITED STATES PATENT OFFICE 2,378,152

RECOVERING RESINS FROM COAL

Adriaan Nagelvoort, Salt Lake City, Utah

No Drawing. Application August 3, 1942,
Serial No. 453,457

4 Claims. (Cl. 209—2)

This invention or discovery relates to recovering resins from coals.

Hard copal resins of the kauri type exist in various coals, notably the upper seams of Utah bituminous coal, to the amount of about 5 per cent of the weight of the coal. The resins are scattered throughout the coal in small lumps, streaks and lenticular masses. The lumps vary in color from light lemon yellow to deep red. Recovered in a pure condition these resins are useful in making oil varnish and for similar purposes. These resins are insoluble in many solvents but, like the kauri copals of commerce, they can be "run" and are afterwards soluble in drying oils, such as linseed oil.

In my copending application Serial No. 368,737, filed December 5, 1940, for Recovering resins from coal, of which this application is a continuation-in-part, there are disclosed and claimed methods of recovering resins from coal, by a sink-and-float procedure, making use of the differences in true specific gravity between resins and coal; and of freeing the resins of asphalts and waxes by further sink-and-float steps. The resin product is useful in varnishes, and can be further purified, advantageously by the solvent process of my application Serial No. 432,087, filed February 23, 1942, for Purifying resins, to yield a product comparable in every respect to the best grade fossil copals.

The present invention is concerned with improvements in recovering reisns from coal, and especially in the initial stages of concentration. The object is to simplify and cheapen the preliminary rough concentration and to provide a process affording an economical preliminary separation of resin from coal without any necessity for using costly solutions, etc., or chemicals which have to be recovered.

As as advantageous preliminary step the raw coal is first broken down to a rather coarse lump size, usually just small enough to pass a one-inch screen, is tumbled to dislodge the resin and is screened through a relatively fine screen. Although in the breaking-down step only a relatively small fraction of the coal is broken to a size passing the fine screen, this fraction contains most of the resin. The fine fraction is now crushed to fine grains, say minus 20 mesh, conveniently in a rod mill.

If desired, however, the raw coal can be crushed directly to treatment size rather than proceeding as above. But the foregoing treatment keeps the resin-freed coal in relatively coarse form which commands a higher price than powdered coal.

The dry-concentrated material or the raw coal, as the case may be, is now subjected to a wetting treatment such as to cause the coal proper to be wet without wetting the resin. I find that water containing tannic acid 1:1000000 achieves this end.

The wetting treatment is conveniently carried out in the mill in which the dry concentrate, or the raw coal, is being reduced to powder. Under these conditions 1000 pounds of coal-resin require only about 800 pounds of water for thorough wetting. By using this minimum quantity, wetting is much more rapid and complete than if a great excess of water is used.

In this stage the coal is wetted but the resins and waxes are not wetted.

The wetted material or pulp is now flowed in aqueous suspension up a deep pocket classifier of type known in ore dressing; an upright cylinder in which the flow rate is maintained such that the resin (and a little coal) are carried up and floated off while the wetted coal sinks. The floated part or concentrate contains roughly 60% resin and 40% coal.

The purity of the concentrate depends upon the speed with which the coal is run through the apparatus; the faster the speed the more coal goes with the resin, hence the lower the purity of the concentrate. I have, however, determined that a speed which gives a concentrate containing approximately 60% resin is the most efficient.

Instead of separating in a deep pocket classifier, I can separate by agitating the pulp with air. Air bubbles adhere to the non-wetted resin and carry it up, despite the fact that its true specific gravity is greater than 1.0. The wetted coal, whose true gravity is substantially greater than 1.0, sinks. This procedure is not "froth flotation" because in it, it is the coal (the sink) which is selectively wetted while the resin (the float) is unwetted. It is further distinguished from "froth flotation" in that no frother is employed. Tannic acid solution of the concentration employed is solely a wetting agent which has no attributes of a frother. The fact that the resin is not wetted is advantageous, aside from the fact that it enables recovery of the resin by floating it off, because it enables the resin to be readily treated in subsequent steps, which would not be the case were the resin wetted with pine oil or the like. As in the case of the classifier product, the concentrate usually amounts to about 85 pounds per 1000 pounds raw coal.

This resin concentrate in aqueous suspension, from the classifier or from the flotation vat, as the case may be, is now introduced into a log washer, screw conveyor or similar device, where it is treated with water containing 10 parts tannic acid per million. This higher concentration of tannic acid causes the resins to be wet.

The crude resin is now subjected to sink-and-float separation, as described in the acknowledged co-pending application Serial No. 368,737. Conveniently the resin is introduced into an open-topped conical vessel, arranged for overflow of floated material and withdrawal of sunken material at the bottom. The vessel contains a body of an aqueous solution of some inert substance, e. g. salt, of specific gravity adjusted between the true specific gravity of the coal and that of the resin, and containing a suitable wetting agent, e. g. tannic acid or saponin. The coal sinks and the resin, together with the waxes, etc., floats.

In the next step the resin is separated from certain dark resinous impurities with the aid of a salt solution of specific gravity just lower than the true gravity of the dark resinous impurities and higher than the true gravity of the valuable resin and containing a wetting agent for resins, e. g. saponin.

The resin is still contaminated with asphalts and waxes and these are reduced by another sink-float treatment, employing a salt bath of true gravity between that of the asphalts-and-waxes, and that of the resin.

The product is free of coal and is free of mechanically associated asphalts and waxes. It is useful in making varnishes. But for making varnishes of the highest class it is advantageously further treated as described in my acknowledged companion application Serial No. 432,087, by selective solvent removal of asphalts and waxes which are dissolved in the resin or at least so intimately associated with the resin as to be inseparable by sink-and-float procedures.

What I claim is:

1. A method of recovering hard copal resins of the kauri type from resin-bearing coals, the density of the coal being greater than that of the resins, which comprises treating resin-bearing coal granules with water containing a small proportion of tannic acid whereby to wet the coal but not the resins, and subjecting the wetted coal to agitating movement such as to float the unwetted resins and cause the wetted coal to sink.

2. The method of claim 1 wherein said last-named agitating movement comprises flowing said suspension upwardly in a confined zone at a rate sufficient to carry the resin upwardly against gravity but insufficient to carry the coal upwardly along with the resin.

3. The method of claim 1 wherein said last-named treatment comprises agaitating said suspensions with air, to cause the resin, with adhering air bubbles, to float while the wetter coal sinks.

4. A method of recovering hard copal resins of the kauri type from resin-bearing coals, the density of the coal being greater than that of the resins, which comprises treating resin-bearing coal granules with water containing tannic acid in such slight character and in such concentration as to wet the coal but not the resins, and subjecting the wetted coal to a treatment such as to float the unwetted resins and cause the wetted coal to sink, and adjusting the speed of flow in the treatment of the coal to give a concentrate containing approximately 60 per cent resin.

ADRIAAN NAGELVOORT.